United States Patent
Strole et al.

[15] 3,652,358
[45] Mar. 28, 1972

[54] PROCESS FOR THE BONDING OF MULTILAYER, OVERLAPPING FOIL RIBBONS

[72] Inventors: Ulrich Strole, Leutershausen; Rudolf Klein, Mutterstadt; Walter Weidinger, Mannheim-Kafertal, all of Germany

[73] Assignee: Zellstoffabrik Waldhof AG, Mannheim-Waldhof, Germany

[22] Filed: Dec. 27, 1967

[21] Appl. No.: 693,745

[30] Foreign Application Priority Data

Dec. 31, 1966 Germany..........................Z 12,623

[52] U.S. Cl..............................156/218, 156/203, 156/182, 156/309, 156/295
[51] Int. Cl.......................................................B29d 23/10
[58] Field of Search....................156/157, 306, 309, 93, 182, 156/203, 295, 218

[56] References Cited

UNITED STATES PATENTS

| | | | |
|---|---|---|---|
| 3,111,441 | 11/1963 | Grundel | 156/157 |
| 3,122,465 | 2/1964 | Keller et al. | 156/93 |
| 3,134,703 | 5/1964 | Listner | 156/157 |
| 3,271,223 | 9/1966 | Michio Sudo | 156/306 |
| 3,454,442 | 7/1969 | Heller, Jr. | 156/309 |
| 3,526,000 | 8/1970 | Williams | 156/306 |
| 3,008,862 | 11/1961 | Haine et al. | 156/309 |

FOREIGN PATENTS OR APPLICATIONS 1,210,405 2/1966 Germany..............................156/93

*Primary Examiner*—Carl D. Quarforth
*Assistant Examiner*—B. H. Hunt
*Attorney*—Hammond & Littell

[57] ABSTRACT

This invention relates to a process for the bonding of multilayer, overlapping foil ribbons of thermoplastic material comprising the steps of forming a continuous length of at least two foil ribbons of cold thermoplastic material to overlap at the edges, whereby the said overlap comprises at least four layers of said foil ribbon, inserting a continuous heated strip of thermoplastic material in thermoplastic condition between two of said overlapping layers, said continuous heated strip having a width of less than said overlap and a temperature above that required to cause said foil ribbons of thermoplastic material to become viscous and below that required to cause said foil ribbons of thermoplastic material to melt, compacting said overlap, whereby a union is formed between said at least four layers of said foil ribbon in said overlap and said continuous strip, cooling said union and recovering a continuous, bonded, multilayer overlapping foil ribbon.

4 Claims, No Drawings

PROCESS FOR THE BONDING OF MULTILAYER, OVERLAPPING FOIL RIBBONS

THE PRIOR ART

It is already known in the art that multilayer ribbons, which consist entirely or partly of thermoplastic materials, can be bonded together in continuous operation. Furthermore, it is known to bond multilayer foil ribbons in an abutting or overlapping manner, possibly with the aid of suitable heterogeneous materials. For example, an abutting seam on a multilayer ribbon material is already described in the British Pat. No. 532,643. To form the seam, a strip of thermoplastic material was applied to the joint of the edges, and the material was heated from the outside so intensely, that a thorough union of the strip with the multilayer product was effected.

The application of the heat required for the bonding, applied from the outside, requires the employment of relatively high temperatures, in order that the multilayered product can be bonded all the way through to its center. Furthermore, this process requires the installation of relatively intricate apparatus and the observation of specific safety measures to prevent the material to be bonded from adhering to the bonding device or from being damaged by the same, at least on the outside of the layers.

OBJECTS OF THE INVENTION

An object of the invention is to avoid these difficulties and to develop a process of the utmost simplicity to accomplish the bonding of multilayer plastic foils under the best economic conditions.

Another object of the present invention is the development of a process for the bonding of multilayer, overlapping foil ribbons of thermoplastic material comprising the steps of forming a continuous length of at least two foil ribbons of cold thermoplastic material to overlap at the edges whereby the said overlap comprises at least four layers of said foil ribbons, inserting a continuous heated strip of thermoplastic material in thermoplastic condition between two of said overlapping layers, said continuous heated strip having a width of less than said overlap and a temperature above that required to cause said foil ribbons of thermoplastic material to become viscous and below that required to cause said foil ribbons of thermoplastic material to melt, compacting said overlap, whereby a union is formed between said at least four layers of said foil ribbon in said overlap and said continuous strip, cooling said union and recovering a continuous, bonded, multilayer, overlapping foil ribbon.

These and other objects of the invention will become more apparent as the description thereof proceeds.

DESCRIPTION OF THE INVENTION

It has now been ascertained, that these objects can be achieved by employing a process for the bonding of multilayer, overlapping foil ribbons of thermoplastic materials, which is characterized in that the heat, necessary for the bonding of the external foil ribbons to he internal foil ribbons, is radiated from a fiber or strip consisting of any known thermoplastic material and heated to the required bonding temperature, which is then at this temperature inserted internally between the overlapping ribbons in such a manner that the thread is joined together with the inner layers and at the same time creates a union between the inner and the outer foil ribbons. More particularly, this process comprises the steps of forming a continuous length of at least two foil ribbons of cold thermoplastic material to overlap at the edges, whereby the said overlap comprises at least four layers of said foil ribbons, inserting a continuous heated strip of thermoplastic material in thermoplastic condition between two of said overlapping layers, said continuous heated strip having a width of less than said overlap and a temperature above that required to cause said foil ribbons of thermoplastic material to become viscous and below that required to cause said foil ribbons of thermoplastic material to melt, compacting said overlap, whereby a union is formed between said at least four layers of said foil ribbon in said overlap and said continuous strip, cooling said union and recovering a continuous, bonded, multilayer, overlapping foil ribbon.

By applying the heat required for the bonding from within, onto the overlapping multilayer foils, a considerably lesser degree of heat is necessary than is the case when the required heat is supplied from the outside.

It was startling indeed to discover that for this purpose only that temperature which suffices for the bonding of the two adjacent inner foils in required. Obviously, because the outer foil layers are in immediate contact with the inner foil layers, the heat supplied from within is transmitted at sufficient rate to the external foil layers to produce a close union. In this manner, a firm bond is produced very rapidly and without any danger that the heated parts of the ribbon may adhere or stick to the apparatus. Moreover, the process of the invention does not call for the usage of complex bonding devices. Instead, merely the customary pressure-contact rollers are used, which, if so desired, can be cooled. In addition, the heating of the plastic thread or ribbon to the temperature required can be carried out in a simple well-known manner without the aid of any intricate apparatus.

This new process can be utilized for the bonding of foils or ribbons of any known thermoplastic materials. In particular, those foils are suitable which consist of polyolefins, such as polyethylene or polypropylene, or of chlorinated vinyl compounds, such as polyvinyl chloride or polyvinylidene chloride. Also, mixed polymerizates or mixtures of polymerizates can be used.

The material of the sealing fiber or thread consists of the same or of a different plastic than that of the foil material. According to the desired width of the seam, the diameter of the sealing fiber or width of the sealing strip can be chosen at random. It should, however, be less than the width of the overlap of the foil ribbon. Advantageously, the sealing thread should have a round profile; however, it may as well have an oval or angular cross section or a serrated profile.

The utilization of a sealing thread material, which has a higher melting index than that of the foil material, has been found particularly advantageous. It can also be of advantage, according to the type of ribbon material used, to employ additives in the thermoplastic material used for the sealing thread, such as plasticizers, lubricants, anti-oxidants, pigments or dyes.

The process of the invention is not only suitable for the formation of a seam in continuously produced foil ribbons, but also, and with particular advantage, for the formation of a continuous seam in continuous tubes formed from flat foils. This continuous tube can then be cut to any length desired and thereafter be worked up in the form of tube parts, preferably in to bags or sacks.

The following example will serve for better comprehension of the object of the invention. However, it should be understood that it does not limit the invention in any manner.

EXAMPLE

A polyethylene foil with a thickness of 100 $\mu$ was produced by means of a gas-pressure extruder. Two rolls of this foil ribbon, each with a width of 113 cm. were suspended in the rollers of a tube machine and from each of the two rollers, a ribbon was simultaneously drawn off.

This two-layer flat ribbon was formed in the apparatus in to a tube having a flat width of 55 cm., whereby its longitudinal edges overlapped one another by 3 cm. Approximately in the center of this overlapping zone, an extruded polyethylene thread of about 2 mm. diameter was placed, in the form of a continuous thread, between the two multilayer ribbon ends. Directly thereafter, the foil tube thus formed was pressed together by means of rollers or cylinders, in the area of longitudinal seam, in such a manner that the two overlapping ribbon parts became joined by means of the polyethylene thread.

During the subsequent travel through the machine, for example, through the crosscutter and discharge means, the extruded polyethylene thread and the longitudinal seam were cooled and solidified. On one hand, the extruded thread produced a firm connection between the overlapping foil portions and, on the other hand, it created at the same time a thermoplastic union between the two double layers. In this manner, a strong longitudinal seam was obtained.

The finished tube could then be worked up in the usual manner into open flat sacks by bonding one tube end, or, after reshaping both tube ends, into bottomed sacks with or without side pleats.

The preceding specific embodiment is illustrative of the practice of the invention. It is to be understood, however, that other expedients known to those skilled in the art can be employed without departing from the spirit of the invention or the scope of the appended claims.

We claim:

1. A process for the bonding of multilayer, overlapping foil ribbons of thermoplastic material comprising the steps of forming a continuous tubular length by overlapping the edges of at least two layers of foil ribbons of cold thermoplastic material whereby the said overlap comprises at least four layers of said foil ribbon, inserting a continuous heated strip of thermoplastic material in thermoplastic condition between two of said overlapping layers at said overlap, said continuous heated strip having a width of less than said overlap and a temperature above that required to cause said foil ribbons of thermoplastic material to bond and below that required to cause said foil ribbons of thermoplastic material to melt, compacting said overlap, whereby a bond is formed between said at least four layers of said foil ribbon in said overlap in said continuous strip, cooling said bond and recovering a continuous, bonded, multilayer, overlapping, tubular foil ribbon.

2. The process of claim 1 wherein said continuous heat strip of thermoplastic material in thermoplastic condition is inserted between the middle layers of said overlap of at least four layers of said foil ribbon.

3. The process of claim 1 wherein said continuous heated strip of thermoplastic material in thermoplastic condition is of the same thermoplastic material as the thermoplastic material of said foil ribbons.

4. The process of claim 1 wherein the thermoplastic material of said continuous heated strip of thermoplastic material in thermoplastic condition has a higher melting index that the thermoplastic material of said foil ribbons.

* * * * *